(12) United States Patent
Bercovitz

(10) Patent No.: US 7,788,148 B2
(45) Date of Patent: Aug. 31, 2010

(54) SYSTEM AND METHOD FOR GUARANTEEING A FINANCIAL LOAN

(76) Inventor: Alan Bercovitz, 366 Victory Hwy., Exeter, RI (US) 02822

( * ) Notice: Subject to any disclaimer, the term of this patent is extended or adjusted under 35 U.S.C. 154(b) by 723 days.

(21) Appl. No.: 11/277,783

(22) Filed: Mar. 29, 2006

(65) Prior Publication Data

US 2006/0143113 A1    Jun. 29, 2006

Related U.S. Application Data

(60) Provisional application No. 60/681,964, filed on May 18, 2005.

(51) Int. Cl.
 G06Q 40/00    (2006.01)
(52) U.S. Cl. .......................... 705/35; 705/38
(58) Field of Classification Search ................... 705/38, 705/35
 See application file for complete search history.

(56) References Cited

U.S. PATENT DOCUMENTS

| | | | |
|---|---|---|---|
| 5,940,812 A * | 8/1999 | Tengel et al. ................. | 705/38 |
| 6,029,149 A * | 2/2000 | Dykstra et al. ............... | 705/38 |
| 6,088,686 A * | 7/2000 | Walker et al. ................ | 705/38 |
| 7,366,694 B2 * | 4/2008 | Lazerson ..................... | 705/38 |
| 2002/0091629 A1 | 7/2002 | Danpour | |
| 2003/0036995 A1 | 2/2003 | Lazerson | |
| 2003/0036996 A1 | 2/2003 | Lazerson | |
| 2004/0059670 A1 | 3/2004 | Mills | |
| 2004/0064402 A1 | 4/2004 | Dreyer et al. | |
| 2004/0167850 A1 | 8/2004 | Dreyer et al. | |
| 2004/0199458 A1 | 10/2004 | Ho | |
| 2005/0108152 A1 | 5/2005 | Tsoa-Lee et al. | |
| 2006/0136330 A1* | 6/2006 | DeRoy et al. ................. | 705/38 |
| 2006/0259420 A1* | 11/2006 | Schaffer et al. ............... | 705/39 |

OTHER PUBLICATIONS

Robert Bruss ("Don't Have A Down Payment? No Problem Don't Wait. Buy A Home Now With Low Or No Down Payment Mortgage. Here Is How You Can Get Pre-Approves") Orlando Sentinel. Orlando Florida: Jul. 23, 2000 p. J.18).*

"Consumer Mortgage Coalition", statement of Anne C Canfield, Hearing on "Simpliyfing the Home Buying Process: HUD's Proposal to Reform RESPA", Feb. 25, 2003.*

"Ohio Homebuyer's Protection Act", p. 2-3: Notification of Higher Fees section.*

"Ameriquest settlement wins approval// Suit accused subprime lender of using bait-and-switch tactics. It will pay between $15 million and $50 million. Series: ameriquest.0625", Andrew Galvin. Orange County Register. Santa Ana Calif: Jun. 25, 2005. p. OC.*

(Continued)

*Primary Examiner*—Ella Colbert
*Assistant Examiner*—Mohammad Z Shaikh
(74) *Attorney, Agent, or Firm*—Cermak Nakajima LLP; Adam J. Cermak

(57) ABSTRACT

If a loan applicant verifies in a timely manner the information they provided at the time of their application and they maintain that information until their closing, then a mortgage broker or mortgage banker will guarantee to deliver the exact mortgage terms contained in the customer's mortgage pre-approval or pay the loan applicant an amount.

8 Claims, 1 Drawing Sheet

OTHER PUBLICATIONS

"InterFirst's OneFee(SM) 'Pricing Tool Only' Enables Mortgage Brokers to Create Guaranteed Mortgage Packages".*

Shen, Jody; Berquist, Erick. "After Respa, Bundling will advance slowly". American Banker, Mar. 24, 2004, 169, 57, 1.*

"NAR Urges Further Review of HUD's RESPA Proposal", Business Wire, Oct. 31, 2002.*

Yip, Pamela, "HUD to make Second Attempt to Simplify Home-Loan Process", Knight Ridder Tribune News-The Dallas Morning, Apr. 5, 2004.*

"First American Introduces Web Services- Based Platform for Bundled Services", PR Newswire, Mar. 15, 2004.*

"Correcting and Replacing WealthSpring Mortgage Announces Lauch of New RightFee Guaranteed Closing Cost System", Business Wire, 5985, Dec. 2, 2003.*

Grant, Rick, "Putting the Closing Package Together; When it comes to making the mortgage process simple, ABN AMRO thinks it has a winning package. The question, is will better doing it like this someday soon?", Broker Magazine, p. 18, Jun./Jul. 2003.*

"OneFee(SM) 'Pricing Tool Only' Now Availabe Through MOAI", PR Newswire, Jun. 28, 2004.*

* cited by examiner

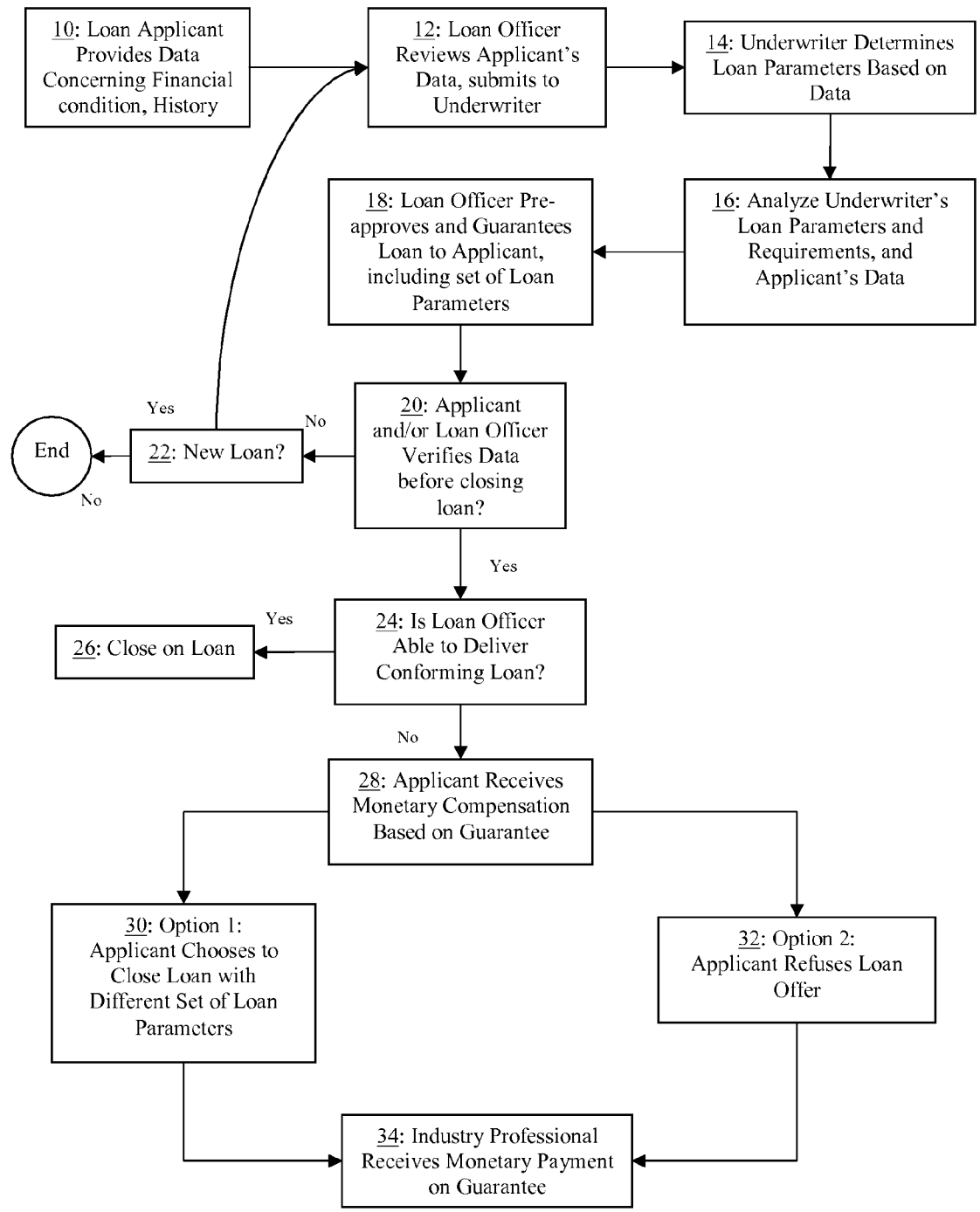

SYSTEM AND METHOD FOR GUARANTEEING A FINANCIAL LOAN

This application claims priority under 35 U.S.C. §119 to U.S. provisional patent application No. 60/681,964, filed 18 May 2005, for "System And Method For Guaranteeing A Financial Loan", by Alan Bercovitz, the entirety of which is incorporated by reference herein.

BACKGROUND OF THE INVENTION

1. Field of the Invention

The present invention relates to devices, systems, and processes useful as financial loan guarantees, and more specifically to mortgage loan guarantees.

2. Brief Description of the Related Art

In general terms, the mortgage industry in the U.S.A. has several different layers of entities that originate, buy and sell, and portfolio mortgages. The largest entities of mortgage businesses include agencies, including semi-governmental agencies (e.g., Fannie Mae and Freddie Mac), and non-governmental companies that competes with the agencies (including large investment banks). The next level of smaller entities include wholesale lenders who mostly sell off mortgages to the larger entities in the next higher layer, but which may also portfolio some mortgage loans. The next level of smaller entities includes the correspondent lender, ranging from a mortgage broker who obtains a warehouse line of credit, making them technically a lender, but who sells off all mortgage loans to a larger wholesale lender, to a much larger company that may sell directly to the largest entities, but doesn't portfolio anything. At the level of the smallest entities are mortgage brokers who originate mortgage loans for individual borrowers/mortgagors, and who then broker those loans to entities in higher levels of the system.

In addition to the more stratified levels discussed above, some mortgage loan entities have characteristics of entities in more than one level. For example, some wholesale lenders also makes loans directly to customers through storefront locations; and this is usually called "retail distribution". Another distinction is sometimes made now for companies that sell directly to consumers without a retail location, e.g., via telephone- and internet-initiated contact with the customer; this distribution method is sometimes called "call center".

The only monetary guarantees currently available in the mortgage market are guarantees to limit total closing costs charged at closing to the amount of total closing cost disclosed at the time of pre-approval, as contained in the Good Faith Estimate of Closing costs. While this currently available guarantee may cap total closing costs, it does not guarantee any other terms of the loan.

Currently it would be illegal in all U.S. jurisdictions to give out a monetary mortgage guaranty certificate directly to an industry professional or for-sale-by-owner who referred a mortgage customer to a mortgage originator, broker, or lender, as it would constitute an illegal referral fee.

SUMMARY OF THE INVENTION

According to a first aspect of the invention, a process of guaranteeing a financial loan comprises providing a guarantee to a loan applicant, the guarantee including a promise to pay to the loan applicant an amount if final terms of an approved loan differ from offered terms of an initial loan either exactly or by a predetermined margin. The offered terms of the initial loan are based at least in part on data concerning the current financial condition supplied by the loan applicant. Determining the final loan terms requires verifying the accuracy of the data concerning the loan applicant, and when the accuracy of the data of the loan applicant has been verified, this guarantee method includes either closing on the loan with the final terms matching the initial terms, or if the loan cannot be closed on the initial terms, then paying to the loan applicant the amount defined in the guarantee.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWING FIGURE

The invention of the present application will now be described in more detail with reference to exemplary embodiments of the system and method, given only by way of example, and with reference to the accompanying drawing, in which an exemplary system and method of the present invention is diagrammatically illustrated.

DETAILED DESCRIPTION OF EXEMPLARY EMBODIMENTS

In general terms, one aspect of the present invention includes methods and systems by which a loan applicant, e.g., for a real property mortgage loan, is given a monetary guarantee that they will receive at closing the exact loan terms they were promised at the time their loan application was approved. Guarantee systems and methods embodying principles of the present invention can provide stability to the process of applying for a loan, particularly for mortgage loans, because they motivate, by providing a disincentive, those persons who or entities which provide the pre-approval loan terms to make a promise on which they cannot deliver. Similarly, the loan applicant, i.e., the proposed borrower, has a much higher level of security that the terms of the loan that are promised to them will be delivered, and thus the loan applicant is able to make collateral plans with a higher degree of confidence that the entire transaction will go through. Thus, systems and processes in accordance with the present invention can: provide added stability to the particular loan market, e.g., mortgage loan market, by increasing the rate at which approved loans are closed; and decrease volatility in real property markets by increasing the likelihood that a pre-approved loan applicant and potential buyer of real estate will actually qualify for a loan of the same terms, which thus can reduce or eliminate the need for including 'loan approval' contingencies in real estate purchase contracts.

Another general aspect includes that the guarantee extends to loan terms, at closing, that vary from the promised terms by set amounts (e.g., percentages, time, and/or dollar amounts), that is, the guarantee is that the delivered loan terms will at most vary from the promised terms by set amounts or margins.

Another general aspect of the present invention includes that the loan on which the guarantee is provided is for one or more of: the purchase of real property, and for which a mortgage is given; the purchase of tangible property, e.g., vehicles; and/or the purchase of other types of assets that have value. Yet another aspect of the present invention includes that the instrument on which the guarantee is provided is for the issuance of insurance policies of any kind, e.g., life, health, casualty, and the like.

Another aspect of the present invention includes that the loan originator, that is, the entity with whom or with which the loan applicant interacts to apply for the loan, is any one of the entities described above that operate in one or more of the loan industry's level. For example, the present invention also includes a guarantee made by one industry participant to another, so that while a loan applicant's application is needed for the process to get underway, the consumer is not the party receiving the guarantee. For example, a wholesaler could issue a guarantee to a broker covering the wholesaler's promise to the broker to make a loan based upon the loan applicant's information that the broker submitted to the wholesaler.

Each of the steps described herein can be performed using a general purpose computing device, e.g., a personal computer, personal digital assistant, and/or computing device that is in communication with a network, e.g., internet, intranet, or extranet, that includes a memory and a set of instructions, that is, logic, specifically scripted to perform the functions, steps, communications, and data manipulations described herein. As the present invention is not limited to any specific instruction set, e.g., code, usable to implement one or more aspects of the present invention, and as those of skill in the art are well aware of the ways to instruct such a computing device to implement such functions, steps, communications, and data manipulations, further details of such specific instruction sets will not be provided here so as to not obscure the present invention. While one or more of the functions, steps, communications, and data manipulations can be performed by hand or by a computer-implemented instruction set, the present invention is not limited to any one subcombination thereof. Data gathering can be performed manually, in a semi-automated manner (e.g., given to a human person who then inputs the data into a computing device's memory), or in a fully-automated manner (e.g., the customer interacts directly with a computing device to input the data into a computer's memory). As will be readily appreciated by those of skill in the art, the present invention also includes the use of multiple computing devices on a communications network (including the use of removable memory media to transfer data between devices), including that the computing device via which data is input by any one human user is different from a computing device that implements decision instruction sets.

Another aspect of the present invention is to provide a monetary guarantee to a loan, e.g., mortgage, applicant. If the applicant verifies in a timely manner the information they provided at the time of their application and they maintain that information until their closing, then the mortgage broker or mortgage banker will guarantee to deliver the exact (or within predetermined variances) mortgage terms contained in the customer's mortgage pre-approval. If the exact (or within predetermined variances) terms are not delivered, then the customer has the option of either: closing a mortgage loan with the mortgage broker or mortgage banker who made the guarantee on different terms than those that were guaranteed, and receiving a monetary credit, e.g., towards their closing costs (the amount of the credit can be either fixed, or variable depending on mortgage terms; a set fee can be any amount); or deciding not to close a mortgage loan with the mortgage broker or mortgage banker who made the guarantee and receive payment on the guarantee because the promised terms were not delivered (the amount of the payment, as described above, can be fixed or variable).

Optionally, the loan applicant also receives an additional "Mortgage Guaranty Certificate", which can be for a fixed or variable monetary amount depending on mortgage variables; a set fee could be any amount. The loan applicant can give the Certificate to any third party, e.g., real estate or other financial industry professional (or a "for sale by owner', also known as a "FSBO") with whom they are working on their mortgage transaction. Thus, if the loan applicant collects on their Guarantee, then the industry professional also collects on their Guarantee. The customer benefits because the industry professional (or 'for sale by owner') knows that the customer has a serious, guaranteed approval, and the customer is worthy of spending time with and/or agreeing to do a transaction with. 'Approvals' from current mortgage companies do not carry the same weight, because there is no financial harm to the mortgage company if the approval is not honored.

Now turning to the single drawing FIGURE, steps of an exemplary method and portions of an exemplary system embodying principles of the present invention are outlined:

10 The loan applicant provides data to a loan officer (the customary financial information, e.g., current financial condition, employment history, etc.) when seeking a mortgage loan;

12 This information and a credit report is submitted to an automated underwriting engine and/or to a human mortgage underwriter or other human industry participant;

14 The mortgage underwriting engine and/or the human underwriter or other human industry participant determines loan parameters (terms) of a loan for which the underwriter's or other human industry participant's lender will provide mortgage financing to the applicant, and informs the loan officer of the terms;

16 The terms are analyzed, e.g., by the loan officer, including the documentation required by the mortgage underwriter in order for the underwriter's lender to deliver those terms;

18 The loan officer questions the applicant and/or the underwriter (almost all companies who have automated underwriting engines also have human underwriters or other human industry participants who make the intermediate and/or final decisions) to clarify any unclear aspects of the approval to determine with certainty whether or not the applicant's financial situation will satisfy the automated underwriting engine's approval; optionally, the loan officer can be replaced with a set of logical instructions performed by a computing device that compare the data received from the applicant and/or underwriter to predetermined data, and produce a set of additional queries based on any discrepancies between the two data sets. Once the 'loan officer' is confident that the applicant's financial situation will at least meet the underwriter's approval, then the loan officer discloses these mortgage terms to the applicant along with all required regulatory disclosures, and provides a Guarantee of the delivery of the mortgage loan to the applicant.

20 If the applicant desires to proceed with a mortgage application under the disclosed terms, then the mortgage process begins and the applicant provides the required documentation necessary to verify their financial situation and to meet the terms of the approval. Outside sources (banks, employers, creditors, appraisers, title attorneys, etc.) may be contacted as necessary by the loan officer to also provide verification of the applicant's information. Information provided by both the applicant and outside sources is sent to the underwriter, usually human for this stage, optionally automated, for final approval.

22 If the loan applicant cannot verify the applicant's data, then the applicant can apply for a new loan, and proceed to step 12, or end the process. If the loan applicant can verify the applicant's data, the lender provides the terms of the mortgage loan it is now willing to deliver, and communicates those terms to the loan officer.

24 It is then determined if the set of loan terms is the same as, or within the established margin from, the guaranteed loan terms.

26 If so, the loan can close.

28 If not, i.e., if the lender's terms are not the same as or within the established margin(s) of the guaranteed term (s), the loan officer can not provide the promised terms and the applicant is entitled to make a claim under the guarantee and receive the compensation defined in the guarantee.

30 The loan applicant's first option is to elect to close the loan despite its lack of conformity with the guaranteed terms.

32 The loan applicant's second option is to refuse to close on the offered, nonconforming loan.

34 Whether the loan applicant chooses to close the loan despite its lack of conformity with the guaranteed terms or refuses to close on the offered, nonconforming loan, the loan applicant can give the 'Certificate' to an industry professional (or FSBO) with whom the applicant was working, who can then also make a claim under their guarantee 'Certificate'.

Payment on the loan applicant's guarantee can be made by any one or more entities involved in the loan application and approval process, at any of the levels described herein; preferably, the loan officer (originator) is the primary guarantor of the loan application and is therefore the entity from whom payment is made under the guarantee and Certificate. Those of skill in the art will immediately appreciate, however, that the guarantee and/or Certificate can instead be backed and paid on by another entity, whether directly involved in the loan application process or not, such as a third-party insurer or the like.

Methods and systems embodying principles of the present invention differ from the processes currently in use in the mortgage market, because the offer loans on different terms than those provided at initial approval; currently do not result in any compensation necessarily flowing to the applicant and/or another similarly negatively effected party to the failed transaction.

The following is a non-exhaustive list of possible reasons that, even if the loan applicant and outside sources confirm the veracity of the applicant's information, the promised mortgage terms will not be delivered:

1) A mistake or misinterpretation by the loan officer or support person;
2) A mistake or misinterpretation by the underwriter or support person;
3) A misunderstanding between the loan officer and the underwriter or support person;
4) A malfunction of an automated underwriting engine giving a "false approval";
5) A change in underwriting guidelines prior to mortgage closing;
6) Bank failure or other financial catastrophe prior to closing;

A mortgage guarantee system and process of the present invention provides a level of security against one or more of items one (1) through six (6) above, and therefore can provide significant benefits to the loan application; inasmuch as item (6) is more dramatic, a mortgage guarantee in accordance with the present invention optionally and preferably excludes item (6).

One or more of the following mortgage terms can be covered by a mortgage guarantee in accordance with the present invention; those of skill in the art will immediately appreciate that other mortgage terms not expressly recited herein can also be used:

The exact interest rate, if the program the loan applicant has been approved under allows for a rate lock and the applicant has elected to lock their rate on or before the day the a guarantee of the present invention is issued;

The exact amount borrowed, rounded to the nearest $100, $1000, or the like, and subject to the underwriter's acceptance of the applicant's estimated property value, which is part of the process of verifying the customer's application information;

Exact down payment percentage;

Exact mortgage term in years;

Whether or not the mortgage offers interest-only payments;

Whether or not the mortgage interest rate will be fixed or adjustable; if adjustable, the index and the margin, the timing of the first interest rate adjustment, the frequency of interest rate adjustments, and the annual and lifetime caps on the interest rate;

Whether or not the mortgage will have payment options (a detailed explanation of those options would be provided to the applicant);

Whether or not the mortgage will have a prepayment penalty; if it will, then the terms of the penalty;

Whether or not the mortgage will have a balloon payment; if it will, then the timing of the balloon payment;

Whether or not the mortgage can be recast; and

Whether or not the interest rate is eligible to ever fall below a starting rate, for an adjustable rate loan.

Further optionally, instead of an exact mortgage term, as described immediately above, a guarantee in accordance with the present invention can operate on ranges or margins from a mortgage term. By way of example and not of limitation, if the interest rate offered differs (e.g., is greater than) by more than a set margin (e.g., 0.5%) from the guaranteed rate, the mortgage guarantee would be triggered. Further optionally, the amount of the guarantee certificate (e.g., $2500) can instead be variable based on the difference between an exact guaranteed mortgage term and the actual offered mortgage term. By way of non-limiting example, the guarantee certificate amount could rise in a known way, e.g., linearly, as the difference between the guaranteed tem and that actually offered increases. Further optionally, the amount of the guarantee certificate can rise with multiple differences between the guaranteed and offered terms.

Another aspect of the present invention includes that, when the applicant is directly given this additional Certificate for them to give to the industry professional (or FSBO) of their choice, then the mortgage broker or banker has not given a referral fee. Should the local law allow or change so that referral fees can be legally paid, then the present invention also includes the use of certificates in accordance with the present invention as a form of referral fees.

A further, optional aspect of the present invention includes that, when the offered loan does not conform to that offered, no monetary penalty is imposed for failing to make the loan. Instead, the offered loan must close and the differences between that guaranteed and that offered are made up by the loan officer or other mortgage entity involved in the mortgage process or by insurance.

While the invention has been described in detail with reference to exemplary embodiments thereof, it will be apparent to one skilled in the art that various changes can be made, and equivalents employed, without departing from the scope of the invention.

What is claimed is:

1. A process of guaranteeing a financial loan, the process comprising:
    providing a guarantee to a loan applicant, the guarantee including a promise to pay to the loan applicant an amount;
    determining via a computer an amount based on the final terms of an approved loan that differ from offered terms of an initial loan by a predetermined margin, wherein the offered terms of the initial loan are based at least in part on data concerning the current financial condition of the loan applicant;
    verifying the accuracy of the data concerning the loan applicant;
    paying to the loan applicant the amount defined in the guarantee.

2. A process in accordance with claim 1, wherein the financial loan is a real property mortgage loan.

3. A process in accordance with claim 1, wherein the offered terms, the final terms, or both, comprise: the interest rate; or the amount of the loan; or the down payment percentage; or the loan term; or the inclusion of an option of interest-only payments; or whether the interest rate is fixed or adjustable and, when the interest rate is adjustable, the index, the margin, the timing of the first interest rate adjustment, the frequency of interest rate adjustments, the annual and lifetime caps on the interest rate, whether or not the interest rate may fall below a starting rate, and combinations thereof; or the inclusion of payment options; or inclusion of a prepayment penalty and, when a prepayment penalty is included, the terms thereof; or inclusion of a balloon payment and, when a balloon payment is included, the timing of the balloon payment; or inclusion of the option to recast the loan; or combinations thereof.

4. A process in accordance with claim 1, further comprising:
    providing a loan certificate to said loan applicant which certificate is redeemable by a third party for payment of an amount, when the loan does not close or closes on different terms than the initial terms.

5. A process in accordance with claim 4, wherein said amount of said certificate is dependent on said predetermined margin.

6. A process in accordance with claim 1, wherein the predetermined margin is zero.

7. A process in accordance with claim 1, wherein the predetermined margin is non-zero and comprises: an interest rate percentage; or the amount of the loan; or the down payment percentage; or the loan term; or the inclusion of an option of interest-only payments; or when the interest rate is adjustable, the index, the margin, the timing of the first interest rate adjustment, the frequency of interest rate adjustments, the annual and lifetime caps on the interest rate, whether or not the interest rate may fall below a starting rate, and combinations thereof; or a prepayment penalty amount; or prepayment penalty terms; or inclusion of a balloon payment; or the timing of a balloon payment; or inclusion of the option to recast the loan; and combinations thereof.

8. A process in accordance with claim 1, wherein said amount of said guarantee is dependent on the predetermined margin.

* * * * *